United States Patent [19]
Kobayashi et al.

[11] Patent Number: 4,957,883
[45] Date of Patent: Sep. 18, 1990

[54] OXYNITRIDE GLASS AND THE FIBER THEREOF

[75] Inventors: Junya Kobayashi, Osaka; Masaaki Oota, Fukui; Katsuhiko Kada; Hiroyoshi Minakuchi, both of Koyto, all of Japan

[73] Assignee: Shimadzu Corporation, Kyoto, Japan

[21] Appl. No.: 319,484

[22] Filed: Mar. 6, 1989

Related U.S. Application Data

[63] Continuation-in-part of Ser. No. 190,385, May 5, 1988, abandoned.

[30] Foreign Application Priority Data

May 28, 1987 [JP] Japan .................... 62-132860
May 28, 1987 [JP] Japan .................... 62-132861
Sep. 7, 1987 [JP] Japan .................... 62-223391

[51] Int. Cl.$^5$ .................... C03C 13/00; C03C 3/062; C03C 3/11
[52] U.S. Cl. .................... 501/35; 501/56; 501/73; 501/74; 501/75; 501/77; 501/78
[58] Field of Search .................... 501/35, 56, 73, 74, 501/75, 77, 78

[56] References Cited

U.S. PATENT DOCUMENTS 4,097,295 6/1978 Chyung et al. .................... 501/56
4,609,631 9/1986 Messier et al. .................... 501/56

OTHER PUBLICATIONS

Homeny J., et al.; "Preparation and Mechanical Properties of Mg-Al-Si-O-N Glasses", Communications of the American Ceramic Society, Nov. 1984, pp. C 225-227.

Preparation de verres azotes dans les systemes M-Si-Al-O-N (M=Nd,Ca,Mn) Etude comparative de quelques proprietes, P. Verdier, R. Pastuszak and Y. Laurent.

*Primary Examiner*—Mark L. Bell
*Attorney, Agent, or Firm*—Jones, Tullar & Cooper

[57] ABSTRACT

An oxynitride glass, a process for preparing same and a fiber thereof, in the glass which has $Si-M_1-M_2-O-N$ system and contains $SiO_2$, $Si_3N_4$ and $M_1O$ in amounts which, as mole %, satisfy the following equations (a) and (b):

$$(SiO_2 + 3Si_3N_4 + M_1O) \times 100 / (100 + 2Si_3N_4) = 65 \text{ to less than } 100 \quad (a)$$

$$(SiO_2 + 3Si_3N_4)/M_1O = 0.7 \text{ to } 2.3 \quad (b)$$

wherein $M_1$ is Ca, or Ca and Mg; $M_2$ is at least one of the metal selected from the group consisting of Al, Sr, La, Ba, Y, Ti, Zr, Ce, Na, K, Sb, B, Cr, Pb, V and Sn, said glass containing 0–40 mole% $SiO_2$, 26–70 mole % CaO, 0–20 mole % MgO, and over O to not more than 22 at % $M_2$.

8 Claims, 10 Drawing Sheets

OXYNITRIDE GLASS AND THE FIBER THEREOF

This is a continuation-in-part application of U.S. patent application Ser. No. 190,385 filed May 5, 1988, now abandoned.

FIELD OF THE INVENTION

The present invention relates to an oxynitride glass, the process for production thereof, and the fiber of the oxynitride glass. More particularly, the present invention relates to an oxynitride glass which has a high elastic modulus and an excellent hardness, and is adapted to a reinforcing material, as well as the process for production thereof and the fiber of the oxynitride glass.

The oxynitride glass of the present invention is formed into a fiber or a chip which is adapted to a raw material for a composite material such as a reinforcing material for a plastic composition and a lining on the surface of a metal. The oxynitride glass in a form of a plate or a bulk of the present invention is directly used for various applications such as a molding having high hardness and high tensile strength.

The fiber of the present invention is adapted to a reinforcing fiber for composite materials such as fiber-reinforced-plastic(FRP) and fiber-reinforced-cement.

BACKGROUND OF THE INVENTION

An oxynitride glass has a structure formed by the replacement of oxygen in an oxide glass by trivalent nitrogen. It is considered that the replacement leads to a tightening of the glass network by means of the formation of more bonds than those of an oxide glass. Therefore, an oxynitride glass has a high elastic modulus in comparison with a conventional glass.

The compositions of known oxynitride glasses include Ca—Si—Al—O—N, Na—Ca—Si—O—N, La—Si—Al—O—N, Na—B—Si—O—N, Mg—Si—Al—O—N, Si—Al—O—N, Y—Al—Si—O—N, Na—B—Al—P—O—N and the like.

These oxynitride glasses are produced by, for example, melting, sol-gel, or $N_2$-blowing-methods, and by treatment of a porous glass with $NH_3$ gas.

According to the melting method, a metal nitride is incorporated into a metal oxide and melted at a high temperature. Examples of such a metal oxide include $SiO_2$, $Na_2O$, $K_2O$, $La_2O_3$, $Y_2O_3$, $ZrO_2$, $TiO_2$, $B_2O_3$ (boron may be considered as a metal, in context). Examples of such a metal nitride include $Si_3N_4$, AlN and the like.

According to sol-gel method, an oxide glass precursor having —OH or —OR is reacted with $NH_3$. Examples of such an oxide glass precursor are silicon tetraalkoxide, titanium tetraalkoxide and the like.

Known oxynitride glass compositions have a nitrogen content of less than 15 atomic percent (9% by weight). That is, a known composition or compounding ratio of components of a oxynitride glass can not replace the oxygen in an oxide glass with nitrogen sufficiently. The nitrogen of a raw material runs away from the glass system during the preparing of an oxynitride glass, so that there is obtained a oxynitride glass having a low nitrogen content (5–6% by weight).

Glass fibers are useful as a reinforcing material. As an effective method for reinforcing a material for a molding such as plastics or cement, it has recently progressed to make a composite material which is composed of said material and a glass fiber. Fibers generally used in such a conventional composite materials are E-glass fibers or S-glass fibers whose strength is not yet sufficient. That is, as to elastic modulus, E-glass shows a maximum modulus of 7,500 $kg/mm^2$, and Imperial N-672 having the highest elastic modulus shows only 12,110 $kg/mm^2$.

A known oxynitride glass fiber has been produced by the sol-gel method, and by the method wherein an oxynitride glass bulk is produced and then remelted to give a fiber (see U.S. Pat. No. 4,609,631). A known oxynitride glass fiber obtained by the sol-gel method has an elastic modulus of only about 8,000 $kg/mm^2$, which is not yet sufficient for reinforcing glass fibers of composite materials. On the other hand, a known oxynitride glass fiber produced by remelting of a bulk oxynitride glass has the maximum nitrogen content of 15 atomic percent (at%) and a high elastic modulus of 140–180 Gpa, but such a fiber is very expensive because it contains 42.6–45.4% by weight (wt%) of yttrium.

The present inventors have intensively studied to obtain an oxynitride glass and the fiber of the same having an excellent strength for reinforcing materials by replacing oxygen in an oxide glass with nitrogen effectively. As the result, it has been found that an oxynitride glass can contain a large amount of nitrogen by increasing the content of CaO, and that a fiber made from such oxynitride glass by melting method has a remarkably high strength and high elastic modulus.

SUMMARY OF THE INVENTION

Accordingly, it is an object of the present invention to provide an arynitride glass having a high hardness and elastic modulus.

It is another object of the present invention to provide a process for preparing an oxynitride glass fiber having a high nitrogen content and a high elastic modulus.

It is further object of the present invention to provide a glass fiber having a high elastic modulus.

These and other objects and advantages of the invention will be apparent to those skilled in the art from the following description.

A novel oxynitride glass of the present invention has $Si—M_1—M_2—O—N$ system and contains $SiO_2$, $Si_3N_4$ and $M_1O$ in amounts, as mole %, satisfying the following equations (a) and (b):

$(SiO_2, + 3Si_3N_4 + M_1O) \times 100/(100 + 2Si_3N_4) = 65$ to less than 100     (a)

$(SiO_2, + 3Si_3N_4)/M_1O = 0.7$ to 2.3     (b)

wherein $_1$ is Ca, or Ca and Mg; $M_2$ is specific metals except Ca and Mg.

That is, the oxynitride glass can contain a large amount of nitrogen by incorporating a large amount of CaO, or CaO and MgO so that the glass has a remarkably high elastic modulus and hardness.

A process for preparing the improved oxynitride glass having high elastic modulus and containing 0–40 mole % $SiO_2$, 26–70 mole % CaO, 0–20 MgO, and over 0 to not more than 22 at % $M_2$, comprises the following steps:

(i) mixing of
    $SiO_2$,
    $Si_3N_4$, or $Si_3N_4$ and AlN and/or BN,
    a compound selected from the group consisting of $Al_2O_3$, BaO, $Sb_2O_3$, SrO, $Na_2O$, $K_2O$, $La_2O_3$, CeO$_2$, Y$_2$O$_3$, ZrO$_2$, TiO$_2$, B$_2$O$_3$, Cr$_2$O$_3$, PbO, V$_2$O$_5$ and SnO$_2$; and a compound which leads a metal oxide by thermal decomposition,
a compound selected from the group of CaO, CaO+MgO, and a compound which leads to CaO or MgO by thermal decomposition,
in amounts which, as mole %, satisfy the following equations (a) and (b):

$$(SiO_2+3Si_3N_4+CaO+MgO)\times 100/(100+2Si_3N_4)=65 \text{ to less than } 100 \quad (a)$$

$$(SiO_2+3Si_3N_4)/(CaO+MgO)=0.7 \text{ to } 2.3 \quad (b)$$

in which equations CaO is mole % of CaO or mole % of a compound converted to CaO basis; MgO is mole % of MgO or mole % of a compound converted to MgO basis.
(ii) heating the mixture to melt at a temperature of 1400°–1900° C. under an inert atmosphere.

The present oxynitride glass fiber is a fiber made of the above mentioned glass.

BRIEF DESCRIPTION OF THE DRAWINGS

In FIG. 3, the abscissa indicates nitrogen content (at %) in the fibers, and the ordinate indicates elastic modulus.

DETAILED DESCRIPTION OF THE INVENTION

The oxynitride glass of the present invention contains a large amount of nitrogen of 15 at % or more, and hence, it has a close bridge formation based on Si—N bonds. Accordingly, the glass of the present invention has a more tightened glass network in comparison with a known glass, and it leads to hardness of the surface and a high elastic modulus of the glass.

The invention provides a glass fiber which has a nitrogen content of 15–30 at % and an elastic modulus of not less than 12,500 kg/mm$^2$ by melting a cheap raw material and spinning. According to the invention, there can be obtained a high elastic modulus which cannot be obtained by a known glass fiber.

The oxynitride glass of the present invention has an Si—M$_1$—M$_2$—O—N glass system, in which M$_1$ is Ca or Ca+Mg. That is, the oxynitride glas has an Si—Ca—M$_2$—O—N or Si—Ca—Mg—M$_2$—O—N glass system. Suitable examples of the metal M$_2$ are Al, Sr, La, Ba, Y, Ti, Zr, Na, K, Sb, B, Ce, Cr, Pb, V, Sn and the like. These metals may be in combinations of two or more thereof Therefore, the typical compositions of the oxynitride glass are Ca—Si—Al—O—N, Na—Ca—Si—O—N, La—Ca—Si—Al—O—N, Na—B—Ca—Si—O—N, Mg—Ca—Si—Al—O—N, Si—Ca—Al—O—N, Y—Al—Ca—Si—O—N, Na—B—Ca—Si—Al—P—O—N, Ca—Mg—Si—Al—O—N, Sr—Ca—Mg—Si—Al—O—N, Ba—Ca—Mg—Si—Al—O—N, Y—Ca—Mg—Si—Al—O—N and the like.

Further, the oxynitride glass has a composition wherein the oxide system is in a mole % satisfying the following relationships [a] and [b]:

$$(SiO_23Si_3N_4+CaO+MgO)\times 100/(100+2Si_3N_4)=65 \text{ to less than } 100 \quad (a)$$

$$(SiO_3+3Si_3N_4)/(CaO+MgO)=0.7 \text{ to } 2.3 \quad (b)$$

in which equations CaO is mole % of CaO or mole % of a compound converted to CaO basis; MgO is mole % of MgO or mole % of a compound converted to MgO basis. The oxynitride glass of the present invention contains a large amount of Ca and Mg in comparison with a known oxynitride glass. When $(SiO_2+3Si_3N_4+CaO+MgO)\times 100/(100+2Si_3N_4)$ is smaller than 65 mole %, there is obtained a glass having a crystal. When $(SiO_2+3Si_3N_4)/(CaO+MgO)$ is smaller than 0.7, or over 2.3, a resultant glass has a nitrogen content of less than 15 at %, so that the glass does not have a high elastic modulus.

The oxynitride glass of the present invention contains 0–40 mole % SiO$_2$, 26–70 mole % CaO, 0–20 mole % MgO, and over 0 to not more than 22 at % M$_2$.

To obtain the oxynitride glass of the present invention, it is preferable to mix
(i) SiO$_2$;
(ii) Si$_3$N$_4$, or Si$_3$N$_4$ and an other metal nitride;
(iii) a metal oxide except CaO and MgO; and
(iv) CaO, or CaO+MgO.

Suitable examples of the metal oxide in (iii) are Al$_2$O$_3$, BaO, Sb$_2$O$_3$, SrO, Na$_2$O, K$_2$O, La$_2$O$_3$, CeO$_2$, Y$_2$O$_3$, ZrO$_2$, TiO$_2$, B$_2$O$_3$, Cr$_2$O$_3$, PbO, V$_2$O$_5$, SnO$_2$ and the like. Instead of these metal oxides, there may be used a compound which leads to the above metal oxide by thermal decomposition, such as a carbonate, hydroxide, oxalate and the like. These metal oxides and the compounds which lead to metal oxides may be used in combinations of two or more thereof Suitable examples of the metal nitride other than $Si_3N_4$ are AlN and BN. It is preferable to use AlN with $Al_2O_3$, and BN with $B_2O_3$. These nitrides and $Si_3N_4$ may be also used in combinations thereof.

The oxynitride glass contains CaO as an essential component. The oxynitride glass may contain CaO with MgO. Further, instead of CaO and MgO, there may be used a compound which leads to CaO or MgO by thermal decomposition, such as a carbonate, hydrate, oxalate and the like.

These raw materials are mixed in such mole % as to satisfying the following equations (a) and (b):

$$(SiO_2+3Si_3N_4+CaO+MgO)\times 100/(100+2Si_3N_4)=65 \text{ to less than } 100 \quad (a)$$

$$(SiO_2+3Si_3N_4)/(CaO+Mg0)=0.7 \text{ to } 2.3 \quad (b)$$

in which equations CaO is mole % of CaO or mole % of a compound converted to CaO basis; MgO is mole % of MgO or mole % of a compound converted to MgO basis.

The oxides and the nitrides are mixed and heated to give the oxynitride glass. Melting of the mixture is preferably carried out at a temperature of 1400°–1950° C., for 1 minute to 3 hours at a heating rate of 10°–800° C./min, under an inert or a nitrogen atmosphere. The inert atmosphere may be at ordinary pressure. Melting is carried out in a heating furnace such as an electric furnace, an image furnace and the like.

Alternatively, the mixture of only the oxides may be melted in a crucible under the air and ground to give a powder. Then, the powder of the oxides is mixed with a nitride, and melted at a high temperature under an inert atmosphere to give the oxynitride glass.

Then, the resultant oxynitride glass is subjected to rapid or slow rate of cooling. The cooled oxynitride glass is removed to a spinning apparatus heated at a temperature of 1100°–1600° C., and it is spun under an inert atmosphere to give a continuous fiber at the spinning rate of 20–3000 m/min.

Alternatively, spinning of the oxynitride glass may be carried out by cooling the melted glass from melting temperature until 1100°–1600° C. in a heating furnace of spinning apparatus and spinning under an inert atmosphere. In this method, a feeder supplies raw materials of the oxynitride glass into a furnace in a spinning apparatus continuously, and there can be carried out by direct spinning The resultant glass has a preferable nitrogen content of 15–30 at %, an elastic modulus of 12,500–25,000 kg/mm², and a tensile strength of 70–500 kg/mm².

When the nitrogen content is smaller than 15 at %, the glass does not show a high elastic modulus. On the other hand, if the nitrogen content is over 30 at %, then the glass is crystallized. Adjustment of the nitrogen content is carried out by the amount of nitride in the additive raw material.

It is preferable that the diameter of the glass fiber is 3–50 μm. When the diameter is smaller than such a range, the handling of the spinning becomes difficult. On the other hand, when the diameter is over that range, the strength is remarkably decreased.

Figure 1:
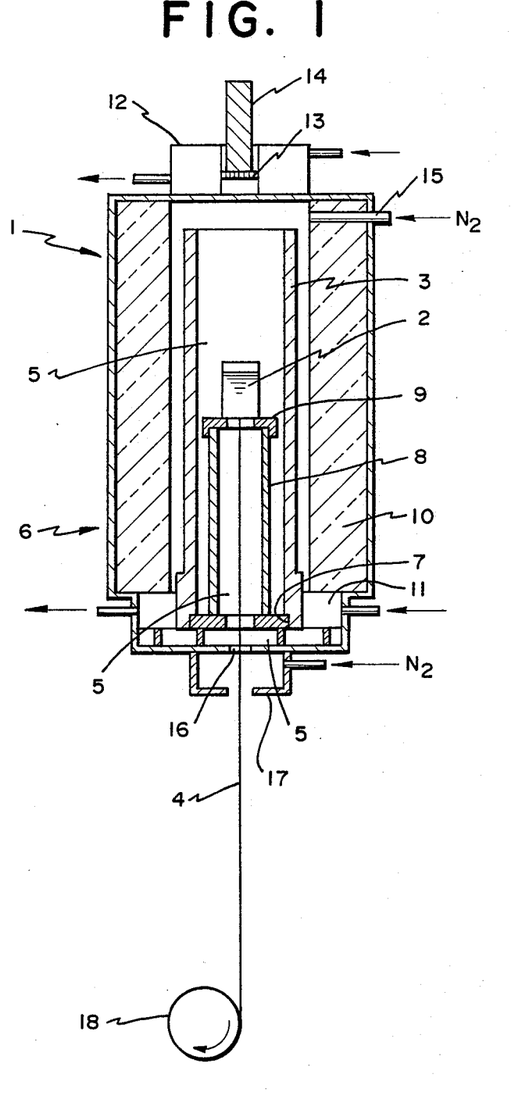
FIG. 1 is a schematic cross-sectional view of a spinning apparatus used for producing the oxynitride glass fiber of the present invention.
Figure 2:
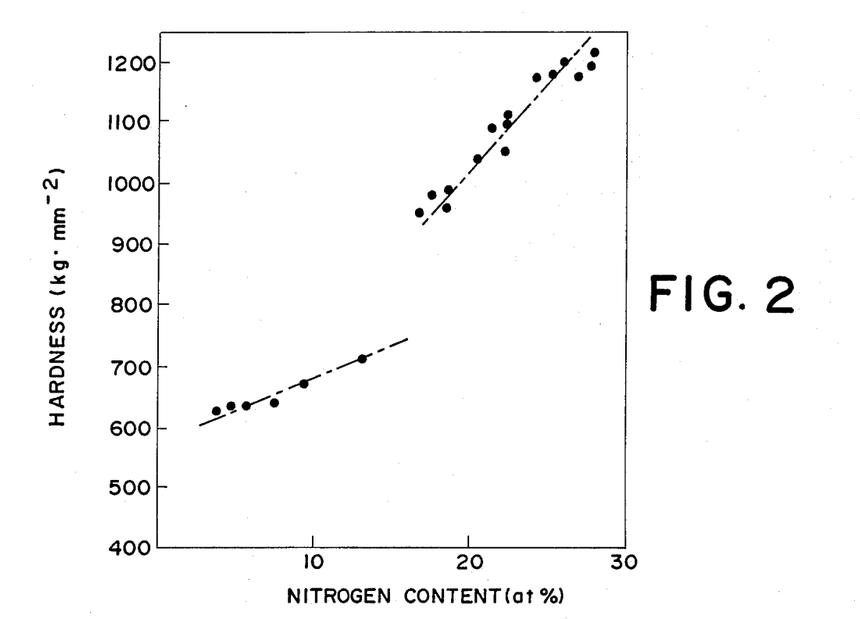
FIG. 2 shows the relationship between Vickers hardnesses and nitrogen contents of the glasses obtained in the reported Examples, from which it is understood that hardness increases with increasing nitrogen content.
Figure 3:
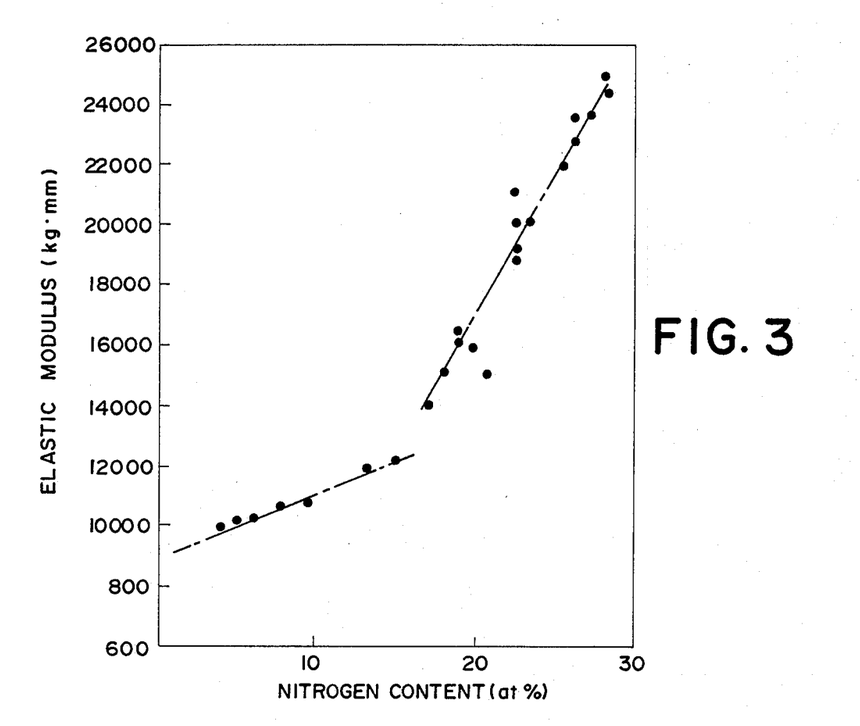
FIG. 3 shows the relationship between elastic moduli and nitrogen contents of the resultant glass fibers in the reported Examples.

Referring now to the drawing, a spinning furnace 1 used for producing the oxynitride glass fibers is illustrated in FIG. 1. The spinning furnace 1 for the glass fibers is provided with a boron nitride crucible 2 having a fine outlet opening (3 mm $\phi$) for the fiber at a lower part thereof; a long graphite heating element 3 surrounding the side surface of the crucible 2; and a casing 6 which contains the crucible 2 and the heating element 3, and is provided with a nitrogen gas chamber 5 where a glass fiber 4 passes through.

The crucible 2 is put on a crucible stand 9 which stands on a cylindrical graphite tube 8 placed on a boron nitride insulator 7 having a central opening where the fiber passes through.

Casing 6 has a heat insulator 10 on a whole inner side wall thereof, cooling jackets 11, 12 on lower and upper parts thereof to give an inner chamber which contains the crucible 2 and heating element 3. Lower cooling jacket 11 contacts the heating element 3 and serving as an electrode. On the other hand, upper cooling Jacket 12 has a central opening, wherein there is provided radiation thermometer 14 having a protective quartz glass plate 13 on the lower side thereof. Further, on the side wall of casing 6, there is provided gas inlet 15, which supplies nitrogen into nitrogen gas chamber 5 which is the inner chamber containing the crucible. On the other hand, there is provided fiber outlet 16, which can open and shut, below the lower cooling jacket 11 to keep an atmosphere contacting with the glass such as a nitrogen gas atmosphere.

In this embodiment, removable auxiliary atmosphere chamber 17 was attached adjacently onto the lower part of said fiber outlet 16, and spinning was carried out in a more complete nitrogen gas atmosphere. The resultant glass fiber 4 is wound onto winder 18.

The present invention is illustrated by the following Examples, which do not, however, limit its scope.

Conditions of preparing the glass and the results are summarized in Table 1. In the Examples, the nitrogen content of the glass fibers was measured by Kjeldahl method and X-ray photoelectron analyzer. cl EXAMPLE 1

$SiO_2$, (22.8 mol %), CaO (40.8 mol %), MgO (12.0 mol %) and $Al_2O_3$ (14.4 mol %) were mixed together to melt at a temperature of 1500° C. for 2 hours in the air. After cooling the mixture, it was ground into a particle size of about 10 μm by a ball mill. Then, it was mixed with $Si_3N_4$ (10 mol %), and was put into a boron nitride crucible 2 placed in the spinning apparatus shown in FIG. 1. The mixture was melted at a temperature of 1750° C. for 30 minutes under a nitrogen atmosphere by a cylindrical carbon heating element 3, which was kept warm by a surrounding heat insulator 10. The temperature was reduced to 1500° C., and thereafter the mixture was spun and wound onto a winder 18. Spinning was carried out at the spinning rate of 1,000 m/min to give a continuous fiber having a diameter of 20 μm. The physical properties of the oxynitride glass fiber are shown in Table 1.

EXAMPLE 2

In the same manner as described in Example 1 but changing the amounts of the raw materials and conditions as reported in Table 1, there was prepared the oxynitride glass fiber.

In Example 2, the oxides were mixed to melt at a temperature of 1500° C. for 40 minutes in the air, and the mixture of the oxides with the nitride were melted at a temperature of 1790° C. for 20 minutes under a nitrogen atmosphere. Spinning was carried out at the spinning rate of 1,200 m/min to give a continuous fiber having a diameter of 18 μm and a length of 3 km. The physical properties of the oxynitride glass fiber are shown in Table 1.

EXAMPLE 3

$SiO_2$ (22.8 mol %), $Si_3N_4$ (10.0 mol %), CaO (40.8 mol %), MgO (12.0 mol %) and $Al_2O_3$ (14.4 mol %) were mixed together before grinding into a particle size of about 10 μm by a ball mill. Then, the mixture was put into a boron nitride crucible 2 shown in FIG. 1, and melted at a temperature of 1750° C. for 30 minutes under a nitrogen atmosphere. The temperature of the oxynitride glass was reduced to a spinning temperature of 1,500° C. and spun at the spinning rate of 1500 m/min to give a fiber having a diameter of 15 μm. The physical properties of the oxynitride glass fiber are shown in Table 1.

EXAMPLE 4

In the same manner as described in Example 3, but changing the amounts of the raw materials and conditions as in Table 1, there was prepared the oxynitride glass fiber. In Example 4, the mixture of the oxides and nitride was melted at a temperature of 1790° C. for 30 minutes. The temperature was reduced to a spinning temperature of 1490° C., and spun at the spinning rate of 1350 m/min to give a fiber having a diameter of 15 μm and a length of 4.5 km.

EXAMPLE 5

The raw oxides listed in Table 1 were mixed and melted at a temperature of 1500° C. for 2 hours in the air. After cooling the mixture, it was ground into a particle size of about 10 μm y a ball mill. Then, it was mixed with $Si_3N_4$ and was put into a boron nitride crucible. The mixture was melted at a temperature of 1750° C. for 30 minutes under a nitrogen atmosphere to give an oxynitride glass.

The resultant oxynitride glass was put into a boron nitride crucible 2 placed in the spinning apparatus shown in FIG. 1. The glass was heated to 1380° C. under a nitrogen atmosphere, and was spun and wound onto a winder. Spinning was carried out at the spinning rate of 1,500 m/min to give a continuous fiber having a diameter of 15 μm.

EXAMPLE 6

In the same manner as described in Example 5 but changing the amounts of the raw materials and conditions as in Table 1, there were prepared the oxynitride glass fiber. Spinning was carried out at a spinning rate of 80 m/min to give a continuous fiber having a diameter of 25 μm.

Examples 7-11, 16-18, 20, 24-34, 37-52 and 55

In the same manner as described in Example 1 but changing the amounts of the raw materials and conditions as in Table 1, there were prepared the oxynitride glass fibers. In these Examples, the oxides were melted at a temperature of 1500° C. for 1 hour in the air.

The physical properties of the oxynitride glass fibers are also shown in Table 1. As a result, the oxynitride glass fibers obtained in Examples 7-9 have low nitrogen contents and low elastic moduli.

EXAMPLE 12

$SiO_2$ (8.6 mol %), $Si_3N_4$ (19.4 mol %), CaO (59.8 mol %), MgO (6.9 mol %) and $Al_2O_3$ (5.2 mol %) were mixed and compressed under a pressure of 1500 kg/cm² for 30 seconds by a rolling mill. The mixture was subjected to heating up to 1780° C. in an image furnace under a nitrogen atmosphere for 3 minutes and melted. Then, the mixture was quickly quenched by a double roller to give an oxynitride glass. The resulting glass was a flake having a thickness of about 25 μm.

The resultant glass was put into a crucible 2 in the spinning apparatus shown in FIG. 1. It was heated at a temperature of 1570° C. under a nitrogen atmosphere, and then was spun to give a continuous fiber.

EXAMPLE 13

$SiO_2$ (8.6 mol %), $Si_3N_4$ (19.4 mol %), CaO (58.3 mol %), MgO (6.9 mol %), $Al_2O_3$ (5.2 mol %) and $Y_2O_3$ (1.5 mol %) were compressed and formed under a pressure of 1500 kg/cm² for 30 seconds. The mixture was subjected to heating up to 1770° C. in an image furnace under a nitrogen atmosphere and melted. The mixture was dropped onto an iron plate placed under the furnace to give an oxynitride glass.

Then, the resultant glass was spun in the same manner as described in Example 12 to give a fiber.

EXAMPLES 14 AND 54

In the same manner as described in Example 13, but changing the amounts of the raw materials and conditions as in Table 1, there was prepared the oxynitride glass fibers.

EXAMPLES 15, 19 AND 21

In the same manner as described in Example 5 but changing the amounts of the raw materials and conditions as in Table 1, there were prepared the oxynitride glass fibers.

EXAMPLES 22, 35 AND 36

In the same manner as described in Example 3, but changing the amounts of the raw materials and conditions as in Table 1, there was prepared the oxynitride glass fibers.

EXAMPLE 23

The raw materials (oxides and nitride) listed in Table 1 were mixed before grinding into a particle size of about 10 μm by a ball mill. The mixture was put into a boron nitride crucible and melted at a temperature of 1730° C. under a nitrogen atmosphere to give an oxynitride glass.

The resultant oxynitride glass was put into a boron nitride crucible 2 placed in the spinning apparatus shown in FIG. 1. The glass was heated under a nitrogen atmosphere and was spun at a temperature of 1530° C. to give a continuous fiber.

EXAMPLE 53

In the same manner as described in Example 12, but changing the amounts of the raw materials and conditions as in Table 1, there was prepared the oxynitride glass fiber.

EXAMPLES 56-61

In the same manner as described in Example 7, the oxides and nitride listed in Table 1 were treated, but there were not obtained oxynitride glasses.

In Examples 56 and 57, $(SiO_2+3Si_3N_4+M_1O) \times 100/(100+2SiO_2)$ is less than 65 mole %, and there were obtained incomplete glasses having part of a crystal phase.

In Examples 58 and 59, $(SiO_2+3Si_3N_4)/M_1O$ is less than 0.7, and the mixtures were not melted completely and gave crystals.

In Examples 60 and 61, $(SiO_2+3Si_3N_4)/M_1O$ is over 2.3, and the mixtures could be melted and contained a crystal phase.

EXAMPLES 62-64

In the same manner as described in Example 7 but changing the amounts of the raw materials and conditions as in Table 1, there were prepared the oxynitride glass fibers.

The physical properties of the oxynitride glass fibers are also shown in Table 1. As a result, it is understood that the oxynitride glass fibers have a low Vickers hardness and elastic modulus.

EXAMPLES 1-1 to 1-7

In the same manner as described in Example 1, but changing the amounts of the raw materials and conditions as in Table 1, there were prepared the oxynitride glass fibers.

The physical properties of the oxynitride glasses are shown in the following Table 1.

TABLE 1

| Example No. | Composition (mol %) | | | | | | | | | |
|---|---|---|---|---|---|---|---|---|---|---|
| | 1 | 2 | 3 | 4 | 5 | 6 | 7 | 8 | 9 | 10 |
| $SiO_2$ | 22.8 | 17.3 | 22.8 | 4.0 | 20.0 | 32.2 | 39.3 | 30.5 | 26.0 | 17.3 |
| $Si_3N_4$ | 10.0 | 15.1 | 10.0 | 18.2 | 12.8 | 8.6 | 4.0 | 9.5 | 11.0 | 15.1 |
| CaO | 40.8 | 56.1 | 40.8 | 65.5 | 40.8 | 55.7 ($CaCO_3$) | 46.7 | 49.4 | 52.4 | 56.1 |
| MgO | 12.0 | 6.5 | 12.0 | 6.8 | 12.0 | | 5.0 | 6.0 | 6.0 | 6.5 |
| $Al_2O_3$ | 14.4 | 5.0 | 14.4 | 5.5 | 14.4 | 4.0 | 5.0 | 4.6 | 4.6 | 5.0 |
| $\frac{(SiO_2 + 3Si_3N_4 + M_1O) \times 100}{100 + 2Si_3N_4}$ | 88.0 | 96.2 | 88.0 | 96.0 | 88.5 | 97.0 | 95.4 | 96.1 | 76.2 | 96.2 |
| $\frac{SiO_2 + 3Si_3N_4}{M_1O}$ | 1.0 | 1.0 | 1.0 | 0.81 | 1.11 | 1.04 | 0.99 | 1.06 | 1.01 | 1.00 |
| melting temperature (°C.) | 1750 | 1790 | 1750 | 1790 | 1750 | 1750 | 1600 | 1700 | 1730 | 1750 |
| spinning temperature (°C.) | 1500 | 1500 | 1500 | 1490 | 1380 | 1415 | 1430 | 1510 | 1520 | 1550 |
| $N_2$ content (at %) | | 18.9 | | 23.1 | | | 5.6 | 12.6 | 14.5 | 19.0 |
| Vickers hardness (kg · $mm^{-2}$) | | | | | | | 660 | 690 | 720 | 990 |
| elastic modulus (kg · $mm^{-2}$) | 13000 | 13500 | 13500 | 14700 | 12600 | 15500 | 10200 | 11500 | 11700 | 15200 |

| Example No. | Composition (mol %) | | | | | | | | | |
|---|---|---|---|---|---|---|---|---|---|---|
| | 11 | 12 | 13 | 14 | 15 | 16 | 17 | 18 | 19 | 20 |
| $SiO_2$ | 17.3 | 8.6 | 8.6 | 10.7 | 16.2 | 4.0 | 29.9 | 21.1 | 16.1 | 9.3 |
| $Si_3N_4$ | 15.1 | 19.4 | 19.4 | 15.1 | 11.3 | 18.2 | 15.0 | 19.7 | 13.1 | 16.4 |
| CaO | 54.6 | 59.8 | 58.3 | 62.5 | 62.5 | 65.5 | 36.9 ($CaCO_3$) | 39.6 ($CaCO_3$) | 49.3 ($CaCO_3$) | 51.8 |
| MgO | 6.5 | 6.9 | 6.9 | 6.5 | 7.0 | 6.8 | 13.0 | 14.0 | 6.3 | 6.6 |
| $Al_2O_3$ | 5.0 1.5($Y_2O_3$) | 5.2 | 5.2 1.5($Y_2O_3$) | 5.2 | 3.0 | 5.5 | 5.2 | 5.6 | 15.2 | 15.9 |
| $\frac{(SiO_2 + 3Si_3N_4 + M_1O) \times 100}{100 + 2Si_3N_4}$ | 95.0 | 96.2 | 95.1 | 96.0 | 97.6 | 96.0 | 96.0 | 96.0 | 88.0 | 88.0 |
| $\frac{SiO_2 + 3Si_3N_4}{M_1O}$ | 1.02 | 1.00 | 1.02 | 0.81 | 0.72 | 0.81 | 1.50 | 1.50 | 0.99 | 1.00 |
| melting temperature (°C.) | 1750 | 1780 | 1770 | 1750 | 1730 | 1780 | 1750 | 1780 | 1730 | 1750 |
| spinning temperature (°C.) | 1550 | 1570 | 1570 | 1550 | 1530 | 1570 | 1550 | 1570 | 1530 | 1550 |
| $N_2$ content (at %) | 18.6 | 23.4 | 22.9 | 19.3 | 15.7 | 23.1 | 18.5 | 23.0 | 15.5 | 19.1 |
| Vickers hardness (kg · $mm^{-2}$) | 1080 | 1120 | 1180 | 980 | 730 | 1080 | 930 | 1100 | 720 | 990 |
| elastic modulus (kg · $mm^{-2}$) | 16100 | 21000 | 20200 | 15100 | 12200 | 18900 | 14900 | 19000 | 12100 | 15600 |

| Example No. | Composition (mol %) | | | | | | | | | |
|---|---|---|---|---|---|---|---|---|---|---|
| | 21 | 22 | 23 | 24 | 25 | 26 | 27 | 28 | 29 | 30 |
| $SiO_2$ | 16.6 | 9.9 | 23.9 | 11.8 | 11.8 | 8.3 | 36.1 | 5.3 | 16.8 | 17.3 |
| $Si_3N_4$ | 12.9 | 16.1 | 11.9 | 17.8 | 17.8 | 19.5 | 8.5 | 22.8 | 13.5 | 15.1 |
| CaO | 42.8 | 44.9 | 44.6 | 48.9 | 46.9 | 53.0 | 30.7 | 32.4 | 56.8 | 54.1 |
| MgO | 12.6 | 13.2 | 14.9 | 16.3 | 16.3 | 13.9 | 3.0 | 0 | 6.3 | 6.5 |
| $Al_2O_3$ | 15.1 | 15.9 | 4.7 | 5.2 | 5.2 2.0($Y_2O_3$) | 5.3 | 13.9(AlN) | 39.5 7.8 | 4.8 1.8(AlN) | 5.0 2.0(SrO) |
| $\frac{(SiO_2 + 3Si_3N_4 + M_1O) \times 100}{100 + 2Si_3N_4}$ | 88.0 | 88.0 | 96.2 | 96.2 | 94.7 | 96.2 | 81.5 | 72.9 | 94.8 | 96.2 |
| $\frac{SiO_2 + 3Si_3N_4}{M_1O}$ | 0.99 | 1.00 | 1.00 | 1.00 | 1.03 | 0.99 | 1.83 | 2.27 | 0.90 | 1.00 |
| melting temperature (°C.) | 1730 | 1750 | 1730 | 1770 | 1770 | 1780 | 1730 | 1750 | 1750 | 1750 |
| spinning temperature (°C.) | 1530 | 1540 | 1530 | 1560 | 1560 | 1580 | 1530 | 1540 | 1550 | 1550 |
| $N_2$ content (at %) | 15.1 | 18.0 | 15.8 | 22.1 | 21.0 | 24.1 | 15.7 | 17.6 | 18.2 | 19.0 |

TABLE 1-continued

| | | | | | | | | | | |
|---|---|---|---|---|---|---|---|---|---|---|
| Vickers hardness (kg · mm$^{-2}$) | 750 | 910 | 730 | 1050 | 1190 | 1180 | 790 | 930 | 860 | 940 |
| elastic modulus (kg · mm$^{-2}$) | 12100 | 14400 | 11900 | 16200 | 17900 | 21900 | 12600 | 15500 | 15000 | 14100 |

| | Composition (mol %) | | | | | | | | | |
|---|---|---|---|---|---|---|---|---|---|---|
| Example No. | 31 | 32 | 33 | 34 | 35 | 36 | 37 | 38 | 39 | 40 |
| SiO$_2$ | 17.3 | 22.8 | 20.4 | 6.1 | 6.0 | 20.7 | 16.2 | 29.9 | 18.5 | 22.9 |
| Si$_3$N$_4$ | 15.1 | 12.9 | 14.6 | 18.9 | 17.5 | 14.7 | 16.9 | 11.9 | 17.8 | 12.6 |
| CaO | 54.1 | 55.4 | 54.4 | 57.3 | 56.0 | 57.5 | 59.5 | 50.8 | 55.5 | 56.3 |
| MgO | 6.5 | 5.9 | 5.8 | 6.9 | 7.5 | 6.5 | 6.7 | 6.2 | 6.8 | 6.3 |
| Al$_2$O$_3$ | 5.0 | 2.0 | 2.9 | 7.2 | 10.0 | 0.6 | 0.7 | 1.2 | 1.4 | 1.9 |
| | 2.0 (BaO) | 1.0 (Sb$_2$O$_3$) | 1.9 (Sb$_2$O$_3$) | 3.5 (CeO$_2$) | 3.0 (CeO$_2$) | | | | | |
| $\frac{(SiO_2 + 3Si_3N_4 + M_1O) \times 100}{100 + 2Si_3N_4}$ | 96.2 | 97.6 | 96.3 | 92.2 | 90.4 | 99.5 | 99.5 | 99.0 | 99.0 | 98.5 |
| $\frac{SiO_2 + 3Si_3N_4}{M_1O}$ | 1.00 | 1.00 | 1.07 | 0.97 | 0.92 | 1.01 | 1.01 | 1.15 | 1.15 | 0.96 |
| melting temperature (°C.) | 1750 | 1750 | 1750 | 1780 | 1770 | 1750 | 1770 | 1730 | 1770 | 1750 |
| spinning temperature (°C.) | 1550 | 1540 | 1550 | 1570 | 1560 | 1550 | 1570 | 1530 | 1570 | 1740 |
| N$_2$ content (at %) | 19.0 | 17.4 | 19.0 | 23.2 | 21.4 | 19.8 | 22.3 | 16.3 | 22.9 | 17.3 |
| Vickers hardness (kg · mm$^{-2}$) | 980 | 820 | 950 | 1110 | 1060 | 980 | 1040 | 790 | 1100 | 840 |
| elastic modulus (kg · mm$^{-2}$) | 14700 | 13700 | 14900 | 18800 | 17500 | 15200 | 16100 | 12100 | 17800 | 13700 |

| | Composition (mol %) | | | | | | | | | |
|---|---|---|---|---|---|---|---|---|---|---|
| Example No. | 41 | 42 | 43 | 44 | 45 | 46 | 47 | 48 | 49 | 50 |
| SiO$_2$ | 16.0 | 26.6 | 32.1 | 10.3 | 20.4 | 12.7 | 4.8 | 1.9 | 5.1 | 4.5 |
| Si$_3$N$_4$ | 16.2 | 14.9 | 12.1 | 18.8 | 13.5 | 17.3 | 14.5 | 15.8 | 14.7 | 14.1 |
| CaO | 59.8 | 49.4 | 47.1 | 60.6 | 55.9 | 59.2 | 48.4 | 49.4 | 49.2 | 44.8 |
| MgO | 6.7 | 6.5 | 6.2 | 6.9 | 6.4 | 6.7 | 0 | 0 | 0.6 | 2.6 |
| Al$_2$O$_3$ | 1.3 | 2.6 | 2.5 | 3.4 | 3.8 | 4.1 | 32.3 | 32.9 | 30.4 | 34.0 |
| $\frac{(SiO_2 + 3Si_3N_4 + M_1O) \times 100}{100 + 2Si_3N_4}$ | 99.0 | 98.0 | 98.0 | 97.5 | 97.0 | 97.0 | 75.0 | 75.0 | 76.5 | 73.5 |
| $\frac{SiO_2 + 3Si_3N_4}{M_1O}$ | 0.97 | 1.28 | 1.28 | 0.98 | 0.97 | 0.98 | 0.99 | 0.99 | 0.98 | 0.98 |
| melting temperature (°C.) | 1770 | 1750 | 1730 | 1780 | 1750 | 1770 | 1730 | 1730 | 1730 | 1730 |
| spinning temperature (°C.) | 1560 | 1550 | 1530 | 1580 | 1550 | 1570 | 1520 | 1530 | 1530 | 1520 |
| N$_2$ content (at %) | 21.5 | 19.3 | 16.1 | 23.9 | 18.1 | 22.2 | 15.5 | 16.6 | 15.9 | 15.0 |
| Vickers hardness (kg · mm$^{-2}$) | 1060 | 960 | 830 | 1100 | 880 | 1090 | 880 | 890 | 860 | 810 |
| elastic modulus (kg · mm$^{-2}$) | 16200 | 15400 | 12200 | 23000 | 14200 | 17000 | 12200 | 13300 | 12600 | 12600 |

| | Composition (mol %) | | | | | | | | | |
|---|---|---|---|---|---|---|---|---|---|---|
| Example No. | 51 | 52 | 53 | 54 | 55 | 56 | 57 | 58 | 59 | 60 |
| SiO$_2$ | 0 | 0 | 11.1 | 7.5 | 2.3 | 2.2 | 2.8 | 17.0 | 18.7 | 10.0 |
| Si$_3$N$_4$ | 21.5 | 19.5 | 23.4 | 21.3 | 22.5 | 14.3 | 13.5 | 10.5 | 9.3 | 20.2 |
| CaO | 35.0 | 35.0 | 62.6 | 66.7 | 62.5 | 35.3 | 33.2 | 63.5 | 62.5 | 25.6 |
| MgO | 0 | 0 | 0.7 | 2.9 | 7.2 | 0 | 5.0 | 7.0 | 5.0 | 3.0 |
| Al$_2$O$_3$ | 43.5 | 42.5 | 2.2 | 1.6 | 5.5 | 48.2 | 45.5 | 2.0 | 2.0 | 41.2 |
| | | 2.0(B$_2$O$_3$) | | | | | | | 2.0(B$_2$O$_3$) | |
| $\frac{(SiO_2 + 3Si_3N_4 + M_1O) \times 100}{100 + 2Si_3N_4}$ | 69.6 | 67.3 | 98.5 | 98.8 | 96.2 | 62.5 | 64.2 | 98.3 | 96.2 | 70.7 |
| $\frac{SiO_2 + 3Si_3N_4}{M_1O}$ | 1.84 | 1.67 | 1.28 | 1.03 | 1.00 | 1.28 | 1.13 | 0.68 | 0.69 | 2.47 |
| melting temperature (°C.) | 1730 | 1730 | 1790 | 1790 | 1790 | 1760 | 1760 | 1800 | 1800 | 1780 |
| spinning temperature (°C.) | 1530 | 1520 | 1590 | 1580 | 1580 | | | | | |
| N$_2$ content (at %) | 16.0 | 15.1 | 27.9 | 26.7 | 27.2 | 11.1 | 10.8 | 15.0 | 13.1 | 15.6 |
| Vickers hardness (kg · mm$^{-2}$) | 900 | 880 | 1220 | 1210 | 1200 | | | | | |
| elastic modulus (kg · mm$^{-2}$) | 13800 | 13500 | 24800 | 23700 | 24400 | | | | | |

| | Composition (mol %) | | | | | | |
|---|---|---|---|---|---|---|---|
| Example No. | 61 | 62 | 63 | 64 | 1-1 | 1-2 | 1-3 |
| SiO$_2$ | 10.2 | 65.0 | 62.0 | 72.0 | 15.8 | 15.8 | 12.7 |
| Si$_3$N$_4$ | 19.4 | 5.0 | 3.0 | 3.0 | 10.5 | 10.5 | 17.3 |
| CaO | 25.8 | 10.0 | 0 | 0 | 57.9 | 57.9 | 59.2 |
| MgO | 3.0 | 0 | 15.0 | 10.0 | 0 | 0 | 4.2 |
| Al$_2$O$_3$ | 38.6 | 20.0 | 20.0 | 15.0 | 14.3 | 13.3 | 4.1 |
| | 3.0(B$_2$O$_3$) | | | | 1.5(Cr$_2$O$_3$) | 2.5(Cr$_2$O$_3$) | 2.5(PbO) |
| $\frac{(SiO_2 + 3Si_3N_4 + M_1O) \times 100}{100 + 2Si_3N_4}$ | 70.0 | 81.8 | 81.1 | 85.8 | 86.9 | 86.9 | 95.1 |

TABLE 1-continued

| $\dfrac{SiO_2 + 3Si_3N_4}{M_1O}$ | 2.38 | 8.00 | 4.73 | 8.1 | 0.82 | 0.82 | 1.02 |
|---|---|---|---|---|---|---|---|
| melting temperature (°C.) | 1770 | 1680 | 1600 | 1600 | 1730 | 1730 | 1730 |
| spinning temperature (°C.) |  | 1500 | 1410 | 1420 | 1520 | 1500 | 1520 |
| $N_2$ content (at %) | 15.1 | 5.1 | 3.2 | 3.3 | 18.8 | 18.8 | 22.2 |
| Vickers hardness (kg · mm$^{-2}$) |  | 680 | 620 | 620 | 1010 | 1010 | 1050 |
| elastic modulus (kg · mm$^{-2}$) |  | 11100 | 10400 | 9600 | 1460 | 14900 | 16500 |

| | Composition (mol %) | | | |
|---|---|---|---|---|
| Example No. | 1-4 | 1-5 | 1-6 | 1-7 |
| $SiO_2$ | 12.7 | 8.3 | 11.8 | 11.8 |
| $Si_3N_4$ | 17.3 | 19.5 | 17.8 | 17.8 |
| CaO | 59.2 | 53.0 | 46.9 | 45.9 |
| MgO | 6.2 | 13.9 | 16.3 | 16.3 |
| $Al_2O_3$ | 4.1 | 4.8 | 5.2 | 5.2 |
|  | 0.5(PbO) | 0.5($V_2O_5$) | 2.0($SnO_2$) | 3.0($SnO_2$) |
| $\dfrac{(SiO_2 + 3Si_3N_4 + M_1O) \times 100}{100 + 2Si_3N_4}$ | 96.6 | 96.2 | 94.7 | 94.0 |
| $\dfrac{SiO_2 + 3Si_3N_4}{M_1O}$ | 9.88 | 9.99 | 1.03 | 1.05 |
| melting temperature (°C.) | 1760 | 1770 | 1750 | 1750 |
| spinning temperature (°C.) | 1560 | 1570 | 1540 | 1540 |
| $N_2$ content (at %) | 22.2 | 24.2 | 22.4 | 22.3 |
| Vickers hardness (kg · mm$^{-2}$) | 1090 | 1060 | 1030 | 1030 |
| elastic modulus (kg · mm$^{-2}$) | 17000 | 17000 | 1600 | 1590 |

The applications of the oxynitride fibers of the present invention are illustrated more specifically by the following Examples.

EXAMPLE 65

(fishing rod)

Figure 4:
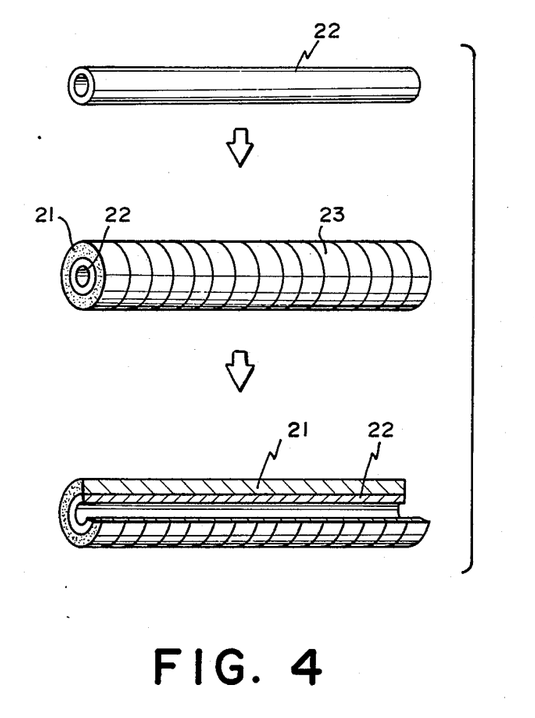
FIG. 4 shows a process for production of a fishing rod using a reinforcing glass fiber (Example 65).

A fishing rod was produced by using the oxynitride glass fibers of the present invention. FIG. 4 shows a process for production of a fishing rod. Into a woven fabric (size: 20–100 cm×200–5000 cm, fineness of a glass fiber: 15 μm, yarn number count: 670 g/km) of the oxynitride glass obtained in the above-mentioned Example 5, an unsaturated polyester resin was impregnated (fiber content: 55 wt %) to give prepreg 21. The prepreg 21 was then wound onto metal core 22 (size: diameter 3–12 mm×length 300 cm), and fixed by an adhesive plastic tape 23. Thereafter, it was cured by heating. The resulting fishing rod has higher strength than that of a conventional a conventional product, and has the same elastic modulus.

EXAMPLE 66

(insulating material for a connector)

An insulating material for a connector was produced by using a powder obtained from the oxynitride glass fiber of the present invention. An oxynitride glass fiber bundle (average fiber diameter: 5 μm) obtained in Example 5 was crushed for 10 minutes in a ball mill (vibration ball mill with almina balls; 1200 rpm). The resulting powdered fibers (4.5 kg) were dry-mixed with crushed pellets of a polybutylene terephthalate resin, thereafter the mixture was kneaded by means of a kneading-extruding machine with mono-axis. The resulting mixture was formed into a rectangular test piece (1.5×8 cm) of an insulating material for a connector by an injection molding machine. The test piece has warp. The heat-deforming temperature of the test piece is 225° C.

EXAMPLE 67

(tension member for an optical fiber)

A tension member for an optical fiber was produced by using the oxynitride glass long fiber in Example 5 and epoxy resin as a matrix by means of pultrusion method.

Figure 5:
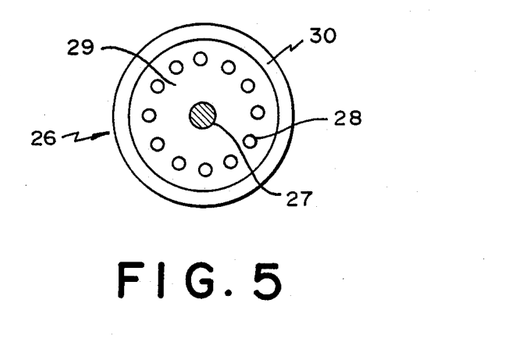
FIG. 5 is a cross-sectional view of a pressure unit of an optical fiber cable (Example 67).

FIG. 5 is a cross-sectional view of a pressure unit of an optical fiber cable. Referring to FIG. 5, a fiber unit 26 has tension member 27 of the oxynitride glass, and apart from which there are coaxially placed many optical fiber wires 28. Among the tension member 27 and wires 28, and among wires 28, an elastomer 29 is filled, and there is provided nylon layer 30 around the elastomer 29.

EXAMPLE 68

(radome membrane)

Into a woven fabric (size: 500×1000 cm, glass fiber diameter: 13 μm, yarn number count: 500 g/km) of the oxynitride glass obtained in abovementioned Example 5, an unsaturated polyester resin (200 g) was impregnated (fiber content: 55 wt %) to give a sheet material. The resultant membrane shows excellent properties for a radome as follows: tensile strength: 85 kg/cm width or more, elongation: 3.5% or less, radio wave transmission coefficient: 96% or more.

EXAMPLE 69

(refractory electric wire)

Figure 6:
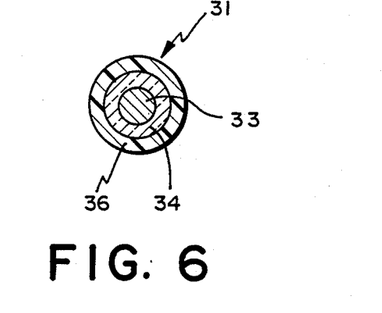
FIG. 6 is a cross-sectional view of a refractory electric wire which employs the oxynitride glass of the present invention (Example 69).

FIG. 6 is a cross-sectional view of a refractory electric wire which employs the oxynitride glass of the present invention. About mono-core conductor 33 (3×8 mm$^2$) of copper in wire 31, there was wound a refractory layer 34 of glass cloth (width of cloth: 20–100 cm, length of cloth: 2000–5000 cm, diameter of fiber: 10–15 μm) made of the oxynitride glass fibers. Further, onto the refractory layer 34 there was disposed a coating layer 36 of a vinylchloride resin. The fire resistance of the resultant wire successfully tested in the test based on the standard (No. 7, dated Oct. 16, 1978) of Japanese Fire Defence Board.

EXAMPLE 70

(glass fiber reinforcing cement molding)

Figure 7:
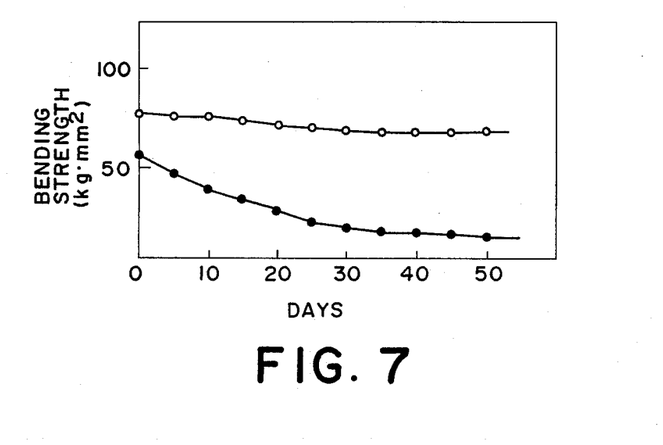
FIG. 7 shows the time-change of bending strength of moldings which employ reinforcing glass fibers (Example 70).

Into a composition for cement mortar was added a foaming agent (0.2 wt %) to give a foaming mortar. Then, into the foaming mortar was added the oxynitride glass (10 vol %) obtained in the above-mentioned Example 5, and mixed to give a foaming premixture. The resultant premixture was dried to adjust a water content to 15%. The resultant formed material was cut into a cubic (30 cm) and formed by press (150 kg) to give a test piece, which was aged and cured for 15 days. FIG. 7 shows the time-change of the bending strength of the resultant molding (mark ○).

In the same manner as described above except that an alkali resistant oxide glass (MINERON-M #801, diameter of fiber: 20 μm, length of fiber: 25 mm, number of bundle: 160, manufactured by Asahi fiber glass company) was used as a reinforcing fiber, there was obtained a test piece. The results are also shown in FIG. 7 (mark ●).

EXAMPLE 71

(bumper)

Figure 8:
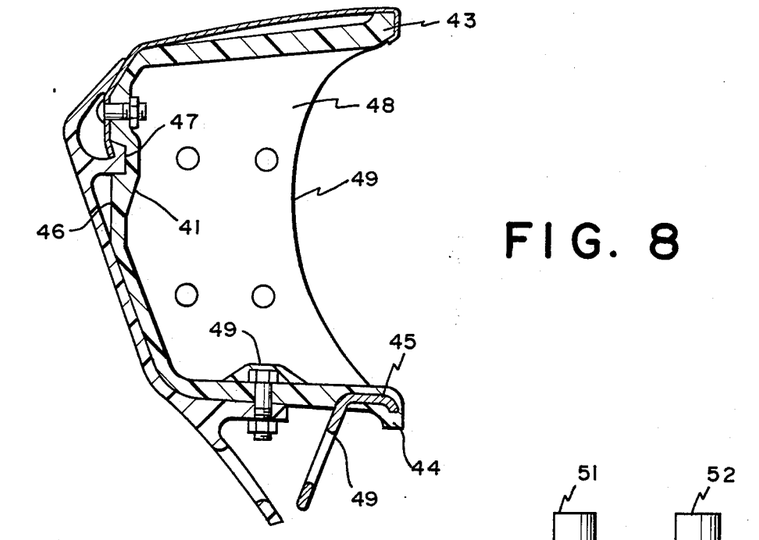
FIG. 8 is a cross-sectional view of a bumper using the oxynitride glass fiber (Example 71).

FIG. 8 is a cross-sectional view of a bumper made by curing of a prepreg in a mould. The prepreg was obtained by impregnating a synthetic resin into the glass fiber in Example 5. In FIG. 8, holder 41 is made from a synthetic resin reinforced by the glass fiber and has a sectional form which is similar to character U. As shown in FIG. 8, holder 41 has projections on the main stressed parts of free ends at upper edge 43 and lower edge 44 of the U form. Further, these parts receiving a large force may be reinforced by attached or inserted reinforcing fragments. For example, a part or all of the inserted metal fragment 45 may be buried into the main stressed parts. Front surface 46 of holder 41 may be reinforced, and therefor a groove 47 is formed. Upper edge 43 and lower edge 44 are protected from bending force by means of fin 48, which is formed in the inner side of holder 41. Such fin 48 fulfils a function as joint member 49 which is integrated with holder 41.

EXAMPLE 72

(flywheel)

Figure 9:
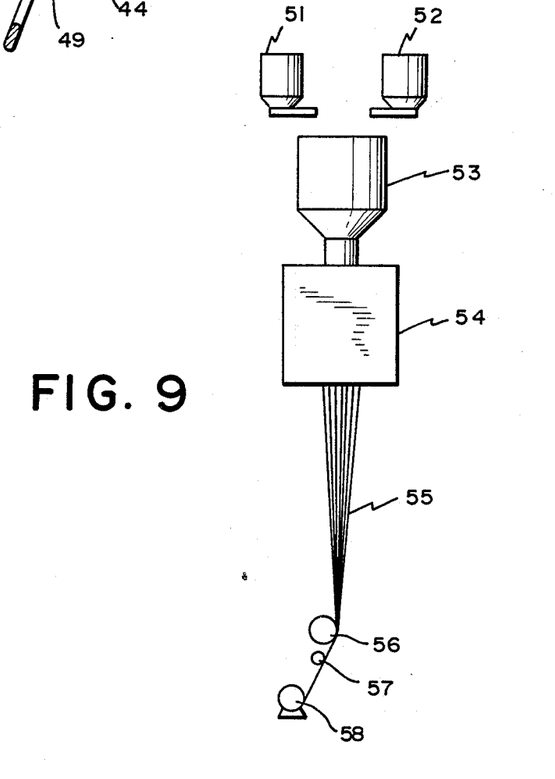
FIG. 9 is a schematic perspective view of an apparatus for preparing the oxynitride glass fiber which is used in a flywheel (Example 72).

$SiO_2$ (22.8 mol %), CaO (40.8 mol %), MgO (12.0 mol %) and $Al_2O_3$ (14.4 mol %) was mixed and burned at a temperature of 1500° C. in air for 2 hours, thereafter the mixture was crushed into a powder (size: 1–10 μm), which was put into a feeder 51 shown in FIG. 9. The powder in feeder 51 and the $Si_3N_4$ powder in feeder 52 were mixed in a continuous mixer 53 with linear increasing of the feed amount of $Si_3N_4$ so as to change a nitrogen content from 1 to 12 wt %, and were led into spinning furnace 54. The raw powders were melted in spinning furnace 54, and spun from a lower brushing kept at 1380° C. The surface of the fibers were treated with roller 56. Then, the fibers were formed into one strand by collecting pad 57, and wound onto a winder 58.

Then, the fibers were unwound with the strand arranged in one direction, and therein a resin was impregnated to form a prepreg. The nitrogen content of the glass fibers in the prepreg increases from one direction to another continuously. The prepreg was wound onto an axis from the end of less nitrogen content, and formed. Accordingly, there was obtained a flywheel in which elastic modulus increases continuously from the center to the periphery.

EXAMPLE 73

(racket frame)

Figure 10A:
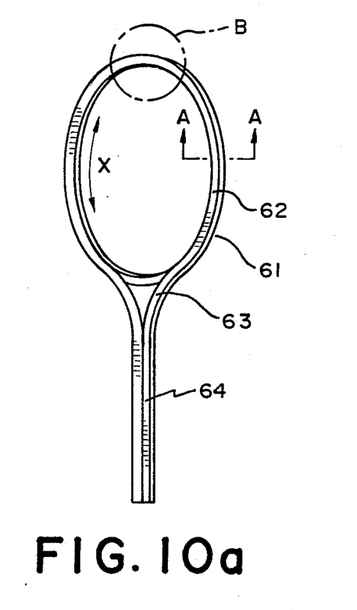
FIG. 10(a) is a perspective view of a racket frame using the oxynitride glass fiber.
Figure 10B:
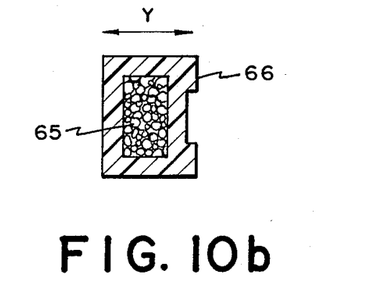
FIG. 10(b) is a cross-sectional view taken along line A—A' of FIG. 10(a)
Figure 10C:
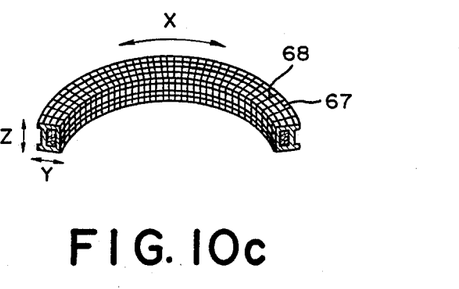
FIG. 10(c) is a perspective view partly broken of the racket frame of FIG. 10(a) (Example 73).

FIG. 10(a) is a perspective view of a tennis racket frame using the oxynitride glass fibers obtained in Example 5. As shown in FIG. 10(a), frame 61 is integrally composed of an elliptic hitting part 62 with strings, racket handle 64, neck part 63 connecting the hitting part 62 and racket handle 64. FIG. 10(b) is a cross-sectional view taken along line A—A' of FIG 10(a). The hitting part 62 has a box type cross-sectional structure which is composed of a core made from a foaming synthetic resin 65 and FRP reinforcing shell 66 about the core. FRP reinforcing shell 66 is, as shown in FIG. 10(c) composed of roving or roving cloth 67 of the oxynitride glass fibers and oxynitride glass fibers or carbon fibers 68. That is, oxynitride glass fibers 67 were arranged along the peripheral direction X of the racket frame, and the other oxynitride glass fibers or carbon fibers 68 were arranged at right angles to the direction of the oxynitride glass fibers 67 (directions y and Z).

Although, the oxynitride glass fibers or carbon fibers 68 are most preferably arranged completely parallel with the direction of width of the frame for striking a ball, these fibers may be arranged at a maximum bias of ±45°, preferably not more than ±30°.

EXAMPLE 74

(protective cloth)

Figure 11A:
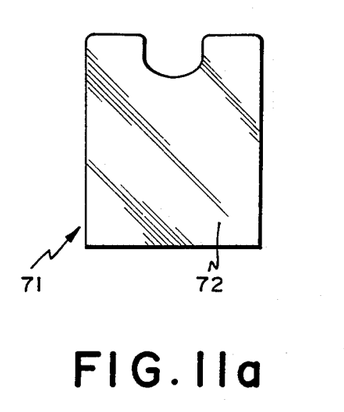
FIG. 11(a) is an elevational view of a protective cloth using the oxynitride glass fiber.
Figure 11B:
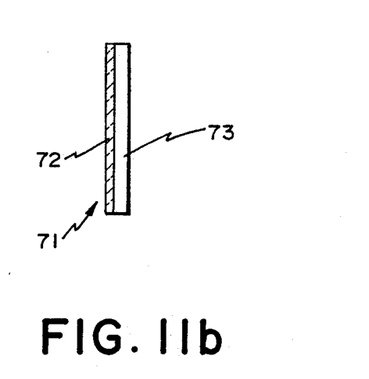
FIG. 11(b) is a cross sectional view of FIG. 11(a) (Example 74).

FIG. 11(a) and FIG. 11(b) are respectively an elevational view and a cross-sectional view of a protective cloth using the oxynitride glass fibers in Example 5. As shown in FIG. 11, the protective cloth 71 is composed of an oxynitride glass fiber layer 72 and cover layer 73, which are sewn or joined by an adhesive. Glass fiber layer 72 was preferably composed of plural sheets of a woven fabric of the oxynitride glass fibers, preferably three sheets because of superiority in heat resistance and elastic modulus. Cover layer 73 may be any conventional cloth. The surface of the cover layer may further be coated by a sheet of a synthetic resin to give water resistance.

EXAMPLE 75

(air filter)

Figures 12, 13, 14A, 14B:
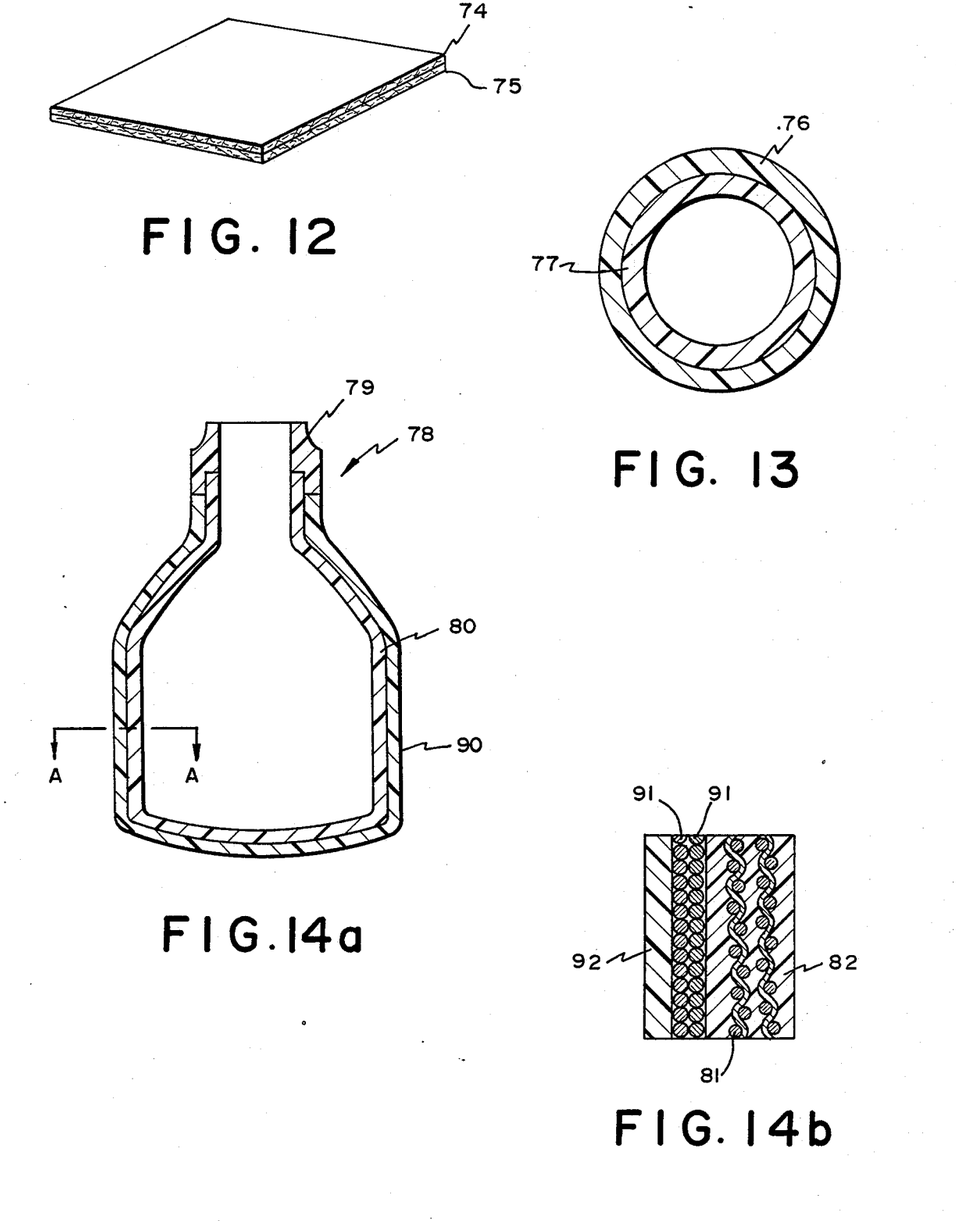
FIG. 12 is a perspective view of an air filter using the oxynitride glass fiber (Example 75).
FIG. 13 is a cross-sectional view of a golf club shaft using the oxynitride glass fiber (Example 76).
FIG. 14(a) is a cross-sectional view of a pressure cylinder using the oxynitride glass fiber.
FIG. 14(b) is a cross-sectional view taken along line A—A of FIG. 14(a) (Example 77).

FIG. 12 is a perspective view of an air filter using the oxynitride glass fiber in Example 5. The oxynitride glass fiber 74 was laminated onto a nonwoven fabric 75 (METSUKE: 80 $g/m^2$, thickness: 0.5 mm) of a polypropylene fiber (diameter of fiber: 2–5 μm) to give a glass fiber layer for dust (METSUKE: 10 $g/mm^2$, thickness: 0.05 mm). The resultant filter has a low pressure loss, high strength and an excellent collecting coefficient of dust.

EXAMPLE 76

(golf club shaft)

FIG. 13 is a cross-sectional view of a golf club shaft using the oxynitride glass fiber in Example 5.

As shown in FIG. 13, carbon fibers (Torayca; T 200, manufactured by Toray Co. Ltd.) impregnated with an epoxy resin was wound onto a conical metal core ( diameter of the smaller end: 4 mm; diameter of the larger end: 14 mm; length 1300 mm) by filament winding method to form inner layer 77 having a thickness of 3 mm. The prepreg, which was obtained by impregnating of an epoxy resin into the resultant oxynitride glass fiber in Example 5, was then wound onto inner layer 77 to form outer layer 76 having a thickness of 1 mm. Onto outer layer 76, a film having a high mold releasing characteristic was tightened. After curing and releasing from a mold, the resulting product was cut, and then the outer layer was ground to a desired size and hardness to give a fiber reinforcing plastic shaft of a golf club.

EXAMPLE 77

(pressure cylinder)

FIG. 14(a) is a cross-sectional view of a pressure cylinder using the oxynitride glass fiber in Example 5. FIG. 14(b) is a cross-sectional view taken along line A—A. In FIG. 14(a), pressure container 78 is composed of a plastic inner cylinder 80 sheath 90 thereon, and plug 79 which forms an opening of the pressure container 78.

Inner cylinder 80 is, as shown in FIG. 14(b), made from resin layer 82 which is reinforced by fibers 81. Suitable examples of the fibers are glass fibers such as oxynitride glass fiber, E-glass fiber, S-glass fiber; metal fibers such as steel fibers; inorganic fibers such as carbon fiber, boron fiber, SiC fiber, almina fiber; fibers of organic polymer such as aramid fiber, polyester fiber, nylon fiber, and a mixture thereof. In view of relative strength, the most preferable fiber is oxynitride glass fibers. The fibers in resin layer 82 may form a woven fabric shown in FIG. 14(b), a sheet made of fibers in one direction, a paper made of staple fibers, or any conventional form of fibers.

The diameter of the fibers, the thickness of a sheet or a woven fabric may be any proper range. It is preferable to use 40 to 80% of reinforcing fibers based on the resin layer.

Sheath 90, which covers the inner cylinder 80 for reinforcing, is composed of reinforcing fiber layer 91, and protective resin layer 92 which protects layer 91. Reinforcing fiber layer 91 contains at least oxynitride glass fibers. It is preferable to wind up an oxynitride glass roving onto resin layer 82. Fiber layer 91 may further contain any other reinforcing fibers. Preferred resins for protective resin layer 92 may be any conventional resin such as a thermosetting resin, a thermoplastic resin, or the like.

Furthermore, the pressure cylinder may be composed of a single layer of a resin matrix containing the oxynitride glass fibers as a reinforcing material without a reinforcing fiber in a sheath. As the reinforcing materials, there may be used the oxynitride glass fiber with a proper form of the above-mentioned inorganic, organic, or metal fibers.

What is claimed is:

1. An oxynitride glass which has $Si-M_1-M_2-O-N$ system and contains $SiO_2$, $Si_3N_4$ and $M_1O$ in amounts which, as mole %, satisfy the following equations (a) and (b):

$$(SiO_2+3Si_3N_4+M_1O)\times 100/(100+2Si_3N_4)=65 \text{ to less than } 100 \tag{a}$$

$$(SiO_2+3Si_3N_4)/M_1O=0.7 \text{ to } 2.3 \tag{b}$$

wherein $M_1$ is Ca, or Ca and Mg; $M_2$ is at least one of the metals selected from the group consisting of Al, Sr, La, Ba, Y, Ti, Zr, Ce, Na, K, Sb, B, Cr, Pb, V and Sn, said glass containing 0–40 mole % $SiO_2$, 26–70 mole % CaO, 0–20 mole % MgO, 15–30 at % $N_2$ and over O to not more than 22 at % $M_2$.

2. An oxynitride glass claimed in claim 1, wherein $M_1$ is Ca.

3. An oxynitride glass claimed in claim 1, wherein $M_1$ is Ca and Mg.

4. An oxynitride fiber which has $Si-M_1-M_2-O-N$ system and contains $SiO_2$, $Si_3N_4$ and $M_1O$ in amounts which, as mole %, satisfy the following equation (a) and (b):

$$(SiO_2+3Si_3N_4+M_1O)\times 100/(100+2Si_3N_4)=65 \text{ to less than } 100 \tag{a}$$

$$(SiO_2+3Si_3N_4)/M_1O=0.7 \text{ to } 2.3 \tag{b}$$

wherein $M_1$ is Ca, or Ca and Mg; $M_2$ is at least one of the metal selected from the group consisting of Al, Sr, La, Ba, Y, Ti, Zr, Ce, Na, K, Sb, B, Cr, Pb, V and Sn, said glass containing 0–40 mol % $SiO_2$, 26–70 mole % CaO, 0–20 mole % MgO, 15–30 at % $N_2$ and over O to not more than 22 at % $M_2$.

5. An oxynitride glass fiber claimed in claim 4, wherein $M_1$ is Ca.

6. An oxynitride glass fiber claimed in claim 4, wherein $M_1$ is Ca and Mg.

7. An oxynitride glass fiber claimed in claim 4, which diameter is 3–50 μm.

8. An oxynitride glass fiber claimed in claim 4, which elastic modulus is not less than 12,500 kg/mm².

* * * * *